(12) United States Patent
Koseoglu

(10) Patent No.: US 11,384,300 B2
(45) Date of Patent: Jul. 12, 2022

(54) INTEGRATED PROCESS AND SYSTEM TO UPGRADE CRUDE OIL

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 77 days.

(21) Appl. No.: 16/721,361

(22) Filed: Dec. 19, 2019

(65) Prior Publication Data

US 2021/0189266 A1 Jun. 24, 2021

(51) Int. Cl.
| | |
|---|---|
| *C10G 69/06* | (2006.01) |
| *C10G 47/20* | (2006.01) |
| *B01J 29/14* | (2006.01) |
| *B01J 35/10* | (2006.01) |

(52) U.S. Cl.
CPC ............ *C10G 69/06* (2013.01); *B01J 29/146* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 35/1061* (2013.01); *C10G 47/20* (2013.01); *C10G 2300/301* (2013.01); *C10G 2300/308* (2013.01)

(58) Field of Classification Search
None
See application file for complete search history.

(56) References Cited

U.S. PATENT DOCUMENTS

| | | |
|---|---|---|
| 3,238,118 A | 3/1966 | Arey, Jr. et al. |
| 3,684,688 A | 8/1972 | Roselius |
| 4,347,120 A | 8/1982 | Anderson et al. |
| 4,604,186 A | 8/1986 | Lutz et al. |

(Continued)

FOREIGN PATENT DOCUMENTS

| | | |
|---|---|---|
| CN | 101638588 B | 7/2012 |
| CN | 103773477 A | 5/2014 |

(Continued)

OTHER PUBLICATIONS

PCT International Search Report and Written Opinion from corresponding PCT Application No. PCT/US2020/065058 dated Mar. 25, 2021.

(Continued)

*Primary Examiner* — Tam M Nguyen
(74) *Attorney, Agent, or Firm* — Leason Ellis LLP

(57) ABSTRACT

The processes and systems herein integrate hydroprocessing and coking in a manner to effectively upgrade/desulfurize crude oil feedstocks. An initial liquid hydrocarbon feedstock, such as crude oil, is upgraded by fractionating both the hydrocarbon feedstock and coker thermally cracked hydrocarbon products in a fractionating zone. A coker recycle stream is thermally cracked to produce coker thermally cracked hydrocarbon products that are passed to the fractionating zone. The hydrocarbon distillates are hydroprocessed under conditions effective for desulfurization and conversion into lighter hydrocarbon distillates to produce a hydroprocessed liquid hydrocarbon effluent, such as a bottomless synthetic crude oil.

20 Claims, 3 Drawing Sheets

(56) References Cited

U.S. PATENT DOCUMENTS

| | | | | |
|---|---|---|---|---|
| 4,750,985 A * | 6/1988 | Aldridge | ............... | C10G 69/06 |
| | | | | 208/108 |
| 7,799,211 B2 | 9/2010 | Koseoglu et al. | | |
| 8,148,285 B2 * | 4/2012 | Kuroda | ................... | C10G 49/08 |
| | | | | 502/79 |
| 8,496,805 B2 | 7/2013 | Sabottke et al. | | |
| 9,221,036 B2 | 12/2015 | Koseoglu et al. | | |
| 10,081,009 B2 | 9/2018 | Koseoglu et al. | | |
| 2012/0298552 A1 * | 11/2012 | Koseoglu | ............... | C10G 55/06 |
| | | | | 208/95 |
| 2013/0026064 A1 | 1/2013 | Koseoglu | | |
| 2013/0026075 A1 | 1/2013 | Koseoglu et al. | | |
| 2013/0028834 A1 * | 1/2013 | Koseoglu | ................ | C10J 3/466 |
| | | | | 423/655 |
| 2014/0350132 A1 * | 11/2014 | Steve | ..................... | C01B 3/386 |
| | | | | 518/703 |
| 2015/0014216 A1 * | 1/2015 | Sundararaman | ....... | C10G 65/12 |
| | | | | 208/49 |
| 2015/0027924 A1 * | 1/2015 | Gupta | .................... | C10G 65/02 |
| | | | | 208/49 |
| 2019/0093026 A1 * | 3/2019 | Wohaibi | ................. | C10G 67/14 |

FOREIGN PATENT DOCUMENTS

| | | |
|---|---|---|
| EP | 0005643 A2 | 11/1979 |
| JP | H0812979 A | 1/1996 |
| WO | 9964540 A1 | 12/1999 |
| WO | 2014022243 A1 | 2/2014 |
| WO | 2014150874 A1 | 9/2014 |
| WO | 2014175978 A1 | 10/2014 |

OTHER PUBLICATIONS

D. Gillis, et al., "Upgrading Residues to Maximize Distillate Yields," Internet Citation, Dec. 31, 2009, pp. 1-19.

* cited by examiner

INTEGRATED PROCESS AND SYSTEM TO UPGRADE CRUDE OIL

RELATED APPLICATIONS

Not applicable.

BACKGROUND OF THE INVENTION

Field of the Invention

This invention relates to improvements in crude oil processing, and in particular to an improved process and system for upgrading crude oil, including sour whole crude oil.

Description of Related Art

Crude oil is typically processed by distillation followed by various cracking, solvent refining and hydroconversion processes to produce a desired slate of products including but not limited to fuels, lubricating oil products, chemicals and chemical feedstocks. An exemplary process includes distillation of a crude oil in an atmospheric distillation column to form several fractions, including gases, naphtha range components, atmospheric gas oil range components, and atmospheric residue. Generally, the atmospheric residue is further fractionated in a vacuum distillation column to produce vacuum gas oil and a vacuum residue. The vacuum gas oil is usually cracked to more valuable light transportation fuel products by fluid catalytic cracking or severe hydrocracking. The vacuum residue may be further treated to recover additional products by upgrading methods such as one or more of residue hydrotreating, residue fluid catalytic cracking, coking, and solvent deasphalting. Streams recovered from crude distillation in fuel boiling point ranges conventionally are used as fuel or fuel precursors.

In certain commercial practices, low-value atmospheric or vacuum distillation bottoms are converted to lighter products and coke using a coking process. Coking of residuum from heavy high sulfur, or sour, crude oils is carried out primarily as a means of utilizing such low value hydrocarbon streams by converting part of the material to more valuable liquid and gas products. The use of heavy crude oils having high metals and sulfur content is increasing in many refineries, and coking units such as delayed coking operations are of increasing importance to refiners. Delayed coking utilizes thermal decomposition of heavy liquid hydrocarbons to produce coke, gas and liquid product streams of varying boiling ranges. The resulting coke is generally treated as a low value by-product, but can be recovered for various uses, depending upon its quality.

Vacuum gas oil fractions are hydrocracked in a large number of petroleum refineries to produce distillates. A typical application of hydrocracking is to process a variety of feeds boiling in the range of 370° C. to 565° C. in conventional units and feeds boiling at 565° C. and above in residue units. In general, hydrocracking processes break the carbon-carbon bonds in feed molecules into simpler molecules (e.g., light hydrocarbons) having higher average volatility and economic value. Additionally, hydrocracking processes typically improve the quality of the hydrocarbon feedstock by increasing the hydrogen-to-carbon ratio and by removing organo-sulfur and organo-nitrogen compounds. The significant economic benefit derived from hydrocracking processes has resulted in substantial development of process improvements and more active catalysts.

One major technical challenge posed when hydrotreating/hydrocracking heavy oil fractions or whole crude is the effect of small concentrations of contaminants, such as organic nickel, organic vanadium, and poly nuclear aromatic compounds. These contaminants and poly nuclear aromatics have been proven to reduce the activity or lifetime of hydrotreating catalysts, reduce process performance and increase capital and/or operating cost of refinery processing units. The metals in the residual fraction of the crude oil deposits on the hydroprocessing catalyst pores and results in catalyst deactivation. The poly nuclear aromatic compounds are coke precursors and at high temperatures form coke, which also results in catalyst deactivation.

The available methods/processes for upgrading/desulfurizing crude oils have limitations in processing the whole crude oils. For example, in fixed-bed reactor units, during processing of whole crude oil, frequent shut-down of the reactors is required for catalyst unloading and replacement due to the metal present in the crude oil. This reduces the on stream factor and as a result increases the processing costs of the hydroprocessing units.

Therefore, there exists a need in the art for improved methods and processes for upgrading/desulfurizing crude oil feedstocks that maximize the on stream factor.

SUMMARY OF THE INVENTION

The processes and systems herein integrate hydroprocessing and coking in a manner to effectively upgrade/desulfurize crude oil feedstocks. In an embodiment, an integrated process for upgrading an initial liquid hydrocarbon feedstock, such as crude oil, comprises fractionating both the liquid hydrocarbon feedstock and coker thermally cracked hydrocarbon products in a fractionating zone to separate commingled hydrocarbons into a hydrocarbon distillates stream and a coker recycle stream. The coker recycle stream is thermally cracked to produce coker thermally cracked hydrocarbon products that are passed to the fractionating zone. The hydrocarbon distillates are hydroprocessed under conditions effective for desulfurization and conversion into lighter hydrocarbon distillates to produce a hydroprocessed liquid hydrocarbon effluent, such as a bottomless synthetic crude oil. In certain embodiments, adsorbent material is added to the fractionating zone or the coker recycle stream prior to thermal cracking. In additional embodiments, the process further comprises recovering coke from the coking zone, and gasifying at least a portion of the recovered coke in the presence of an oxygen-containing gas to produce hydrogen, and recycling at least a portion of the hydrogen to the integrated hydroprocessing step.

In an embodiment, an integrated system for upgrading an initial liquid hydrocarbon feedstock comprises a coking zone, a fractionating zone and a hydroprocessing zone. The fractionating zone includes a feed inlet in fluid communication with a source of the initial liquid hydrocarbon feedstock, a coker inlet for receiving a thermally cracked product stream that is in fluid communication with a thermally cracked product outlet of the coking zone, a distillate product outlet for discharging a distillates stream that is in fluid communication with an inlet of the hydroprocessing zone, and a bottoms outlets for discharging a coker recycle stream that is in fluid communication with an inlet of the coking zone. The coking zone includes the inlet for receiving the coker recycle stream from the fractionating zone and an outlet for discharging a thermally cracked hydrocarbon products stream. The hydroprocessing zone includes the inlet for receiving the distillates stream from the fractionating zone and an outlet for discharging a hydroprocessed liquid hydrocarbon effluent. In certain embodiments, the system further comprises a source of adsorbent material in fluid communication with the fractionating zone or the coker recycle stream. In additional embodiments, the system further comprises apparatus for recovering coke from the coking zone, and a gasification zone, wherein the gasification zone processes at least a portion of recovered coke and includes an outlet for discharging hydrogen that is in fluid communication with the hydroprocessing zone.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where.

DETAILED DESCRIPTION

Figure 1:
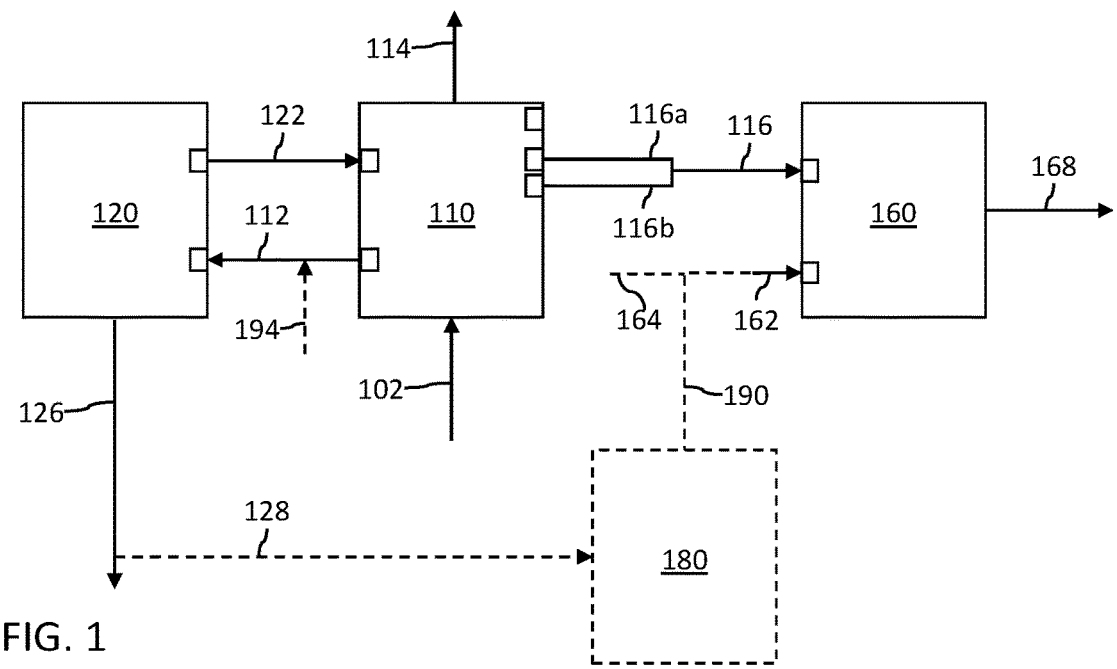
FIG. 1 is a process flow diagram of an embodiment of a system integrating hydroprocessing and coking.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" with respect to a particular stream or plural streams means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include any crude oil produced worldwide. Examples are Arabian Heavy, Arabian Light, Arabian Extra Light, other Gulf crudes, Brent, North Sea crudes, North and West African crudes, Indonesian, Chinese crudes, or mixtures thereof. The crude petroleum mixtures can be whole range crude oil or topped crude oil. As used herein, "crude oil" also refers to such mixtures that have undergone some pretreatment such as water-oil separation; and/or gas-oil separation; and/or desalting; and/or stabilization. In certain embodiments, crude oil refers to any of such mixtures having an API gravity (ASTM D287 standard), of greater than or equal to about 10°, 20°, 30°, 32°, 34°, 36°, 38°, 40°, 42° or 44°.

The term "naphtha" as used herein refers to hydrocarbons boiling in the range of about 20-205, 20-193, 20-190, 20-180, 20-170, 32-205, 32-193, 32-190, 32-180, 32-170, 36-205, 36-193, 36-190, 36-180 or 36-170° C.

The term "light naphtha" as used herein refers to hydrocarbons boiling in the range of about 20-100, 20-90, 20-83, 20-80, 32-100, 32-90, 32-83, 32-80, 36-100, 36-90, 36-83 or 36-80° C.

The term "heavy naphtha" as used herein refers to hydrocarbons boiling in the range of about 80-205, 80-193, 80-190, 80-180, 80-170, 83-205, 83-193, 83-190, 83-180, 83-170, 900-205, 90-193, 90-190, 90-180, 90-170, 100-205, 100-193, 100-190, 100-180 or 100-170° C.

The term "kerosene" as used herein refers to hydrocarbons boiling in the range of about 140-280, 140-270, 140-260, 170-280, 170-270, 170-260, 180-280, 180-270, 180-260, 190-280, 190-270, 190-260, 193-280, 193-270 or 193-260° C.

The term "atmospheric gas oil" and its acronym "AGO" as used herein refer to hydrocarbons boiling in the range of about 250-370, 250-360, 250-340, 250-320, 260-370, 260-360, 260-340, 260-320, 270-370, 270-360, 270-340 or 270-320° C.

The term "atmospheric residue" and its acronym "AR" as used herein refer to the bottom hydrocarbons having an initial boiling point corresponding to the end point of the AGO range hydrocarbons, and having an end point based on the characteristics of the crude oil feed.

The term "vacuum gas oil" and its acronym "VGO" as used herein refer to hydrocarbons boiling in the range of about 350-565, 350-540, 350-530, 350-510, 370-565, 370-550, 370-540, 370-530, 370-510, 400-565, 400-550, 400-540, 400-530, 400-510, 420-565, 420-550, 420-540, 420-530 or 420-510° C.

The term "light vacuum gas oil" and its acronym "LVGO" as used herein refer to hydrocarbons boiling in the range of about 350-425, 350-415, 350-405, 350-395, 370-425, 370-415, 370-405, 370-395, 380-425, 390-425 or 400-425° C.

The term "heavy vacuum gas oil" and its acronym "HVGO" as used herein refer to hydrocarbons boiling in the range of about 425-565, 425-550, 425-540, 425-530, 425-510, 450-565, 450-550, 450-540, 450-530 or 450-510° C.

The term "vacuum residue" and its acronym "VR" as used herein refer to the bottom hydrocarbons having an initial boiling point corresponding to the end point of the VGO range hydrocarbons, and having an end point based on the characteristics of the crude oil feed.

The modifying term "straight run" is used herein having its well-known meaning, that is, describing fractions that are conventionally derived directly from the distillation unit, optionally subjected to steam stripping, rather than being from another refinery treatment such as coking, hydroprocessing, fluid catalytic cracking or steam cracking.

The term "coker gas oil" and its acronym "CGO" are used herein to refer to hydrocarbons boiling in the vacuum gas oil range derived from thermal cracking operations in a coker unit.

The term "heavy coker gas oil" and its acronym "HCGO" are used herein to refer to hydrocarbons boiling in the heavy vacuum gas oil range derived from thermal cracking operations in a coker unit.

The term "light coker gas oil" and its acronym "LCGO" are used herein to refer to hydrocarbons boiling in the light vacuum gas oil range derived from thermal cracking operations in a coker unit.

The term "coker naphtha" is used herein to refer to hydrocarbons boiling in the naphtha range derived from thermal cracking operations in a coker unit.

The term "coker kerosene" is used herein to refer to hydrocarbons boiling in the kerosene range derived from thermal cracking operations in a coker unit.

FIG. 1 is a schematic diagram of a general embodiment of an integrated process and system to upgrade an initial liquid hydrocarbon feedstock such as whole crude oil. It is to be appreciated that features of process and system shown and described with respect to FIG. 1 advantageously can be incorporated in one or more other embodiments described further herein including different types of coker units, embodiments using one or more flash vessels for separation of light gases before fractionating, embodiments using one or more flash vessels for separation of light gases and naphtha before fractionating, and embodiments using integrated heat exchanger(s). The integrated system shown and described with respect to FIG. 1 generally includes a coking zone 120, a fractionating zone 110, and a hydroprocessing zone 160. In certain embodiments, a gasification zone 180 is also integrated (denoted by dashed lines as optional).

The fractionating zone 110 is arranged as a coking unit fractionator, that is, it is in fluid communication with the coking zone 120 to receive a thermally cracked hydrocarbon product stream 122. In addition, the fractionating zone 110 receives (through the same or different inlet) the initial liquid hydrocarbon feedstock 102. This advantageously removes the step of passing the initial liquid hydrocarbon feedstock 102 to a crude oil distillation unit, for instance, an atmospheric distillation tower and a vacuum distillation tower, to obtain a vacuum residue fraction as a typical feedstock to a coking unit. The capacity of the fractionator is increased as compared to typical coker fractionators. The fractionating zone 110 is dimensioned and configured to receive the entire influent feedstock, rather than only the vacuum residue portion. In certain embodiments, the fractionating zone 110 is also capable of handling the adsorbent material and/or catalyst material, for instance so that it is discharged with a coker recycle stream 112, for instance as disclosed in commonly owned U.S. Pat. No. 9,023,192, which is incorporated by reference herein in its entirety.

The fractionating zone 110 includes as inlets one or more feed inlets in fluid communication with a source of initial feedstock 102, and one or more coker inlets (which can be the same or different than the feed inlets) in fluid communication with one or more thermally cracked product outlets of the coking zone 120 to receive a thermally cracked hydrocarbon products stream 122 (optionally via one or more heat exchanges and/or one or more flash vessels shown in other embodiments herein). The fractionating zone 110 also includes as outlets one or more light outlets, one or more distillate outlets and one or more coker recycle outlets. The light outlet is for discharging a light product stream 114 including gases $H_2$, $H_2S$, $NH_3$, $C_1$ to $C_4$ hydrocarbons and in certain embodiments lighter hydrocarbons derived from unstabilized naphtha (full or partial range naphtha, or light naphtha). The distillate outlet is for discharging a hydrocarbon distillates stream 116 and is in fluid communication with the hydroprocessing zone 160. Hydrocarbon distillates stream 116 include straight run distillates 116a and distillates 116b derived from the thermally cracked products, to the hydroprocessing zone 160. The coker recycle outlet is generally the bottoms outlet and is for discharging the coker recycle stream 112 and is in fluid communication with one or more inlets of the coking zone 120. The coker recycle stream 112 can include hydrocarbon components having an initial boiling point corresponding to that of vacuum residue. In certain embodiments the coker recycle stream 112 includes all or a portion of hydrocarbon components from the fractionating zone 110 having an initial boiling point corresponding to that of heavy vacuum gas oil.

The coking zone 120 generally includes a coking drum, or plural coking drums, having one or more inlets in fluid communication with one or more bottoms outlets of the fractionating zone 110 to receive a coker recycle stream 112 as coker feed. In certain optional embodiments (as denoted by dashed lines), a source of catalyst material 194 is provided in fluid or particulate communication with the coking zone 120 inlet, for instance, via the coker recycle stream 112, through another inlet (not shown), or integrated in the fractionator so that the coker recycle stream 112 contains catalyst material. In embodiments in which catalyst material 194 is mixed with the coker recycle stream 112, it can be added to the coker feed, or admixed with use of a separate mixing zone, such as an in-line mixing apparatus or a separate mixing apparatus (not shown in FIG. 1).

The coking zone 120 generally also includes one or more light product outlets in fluid communication with one or more inlets of the fractionating zone 110 for separation of the components of the thermally cracked hydrocarbon products stream 122. In addition, in embodiments in which a delayed coking unit is used, the coking zone 120 generally includes associated apparatus, for instance, hydraulic and/or mechanical cutters, to recover coke 126. In certain embodiments recovered coke 126 is conveyed to a gasification zone 180, for instance, with a transfer line 128 that provides fluid or particulate communication between the gasification zone and the coking zone. In other embodiments coke 126 is conveyed in batch mode (not shown). Raw coke can be subjected to one or more crushing and/or sorting apparatus to convert the coke into suitable form for the gasification reaction. The gasification zone 180 generally includes one or more outlets for discharging hydrogen 190; this hydrogen generated by an integrated system herein can optionally be in fluid communication with the hydroprocessing zone 160 (as shown by dashed lines).

The hydroprocessing zone 160 includes one or more inlets in fluid communication with one or more distillate outlets of the fractionating zone 110 for processing coking unit hydrocarbon distillates stream 116 into a hydroprocessed liquid hydrocarbon effluent stream 168. The hydroprocessing zone 160 is also in fluid communication with a source of hydrogen 162, which can include make-up hydrogen 164 from outside of the integrated system and/or hydrogen 190 from an optional integrated gasification zone 180.

In a process using the system shown and described with respect to FIG. 1, the initial liquid hydrocarbon feedstock 102, such as crude oil, is charged directly to the fractionating zone 110. By directly routing the feedstock 102 to the fractionating zone 110, a conventional dedicated crude oil distillation unit, for instance, atmospheric and vacuum distillation columns to obtain a vacuum residue fraction as a typical feedstock to a coking unit, is eliminated from the process.

The coker recycle stream 112 is optionally mixed with catalyst material 194, for instance, integrated as shown in FIG. 1 with coker recycle stream 112 directly or in a mixing zone such as dedicated mixing vessel or an in-line mixing apparatus. In certain embodiments (not shown), catalyst material can be metered or otherwise charged directly to the drums of the coking zone 120, and accordingly the coker recycle stream 112 is separately charged to the coking zone 120. In certain embodiments (not shown), catalyst material can be metered or otherwise charged directly to the fractionating zone 110, and accordingly the coker recycle stream 112 contains catalyst material.

The stream 112 is thermally cracked in the coking zone 120 to produce thermally cracked hydrocarbon products 122 and by-product coke 126. The thermally cracked hydrocarbon products stream 122 is passed to the fractionating zone 110. In certain embodiments (not shown), all or a portion of gases from the thermally cracked products are flashed off prior to separation in the fractionating zone 110.

The fractionating zone 110 operates with one or more separation columns to fractionate the feeds, including the initial liquid hydrocarbon feedstock 102 and the thermally cracked hydrocarbon products stream 122 from the coking zone 120. A light product stream 114, including gases $H_2$, $H_2S$, $NH_3$ and $C_1$ to $C_4$ hydrocarbons, is discharged from the fractionating zone 110. In certain embodiments the light product stream 114 also includes hydrocarbons at or below the naphtha or light naphtha range, for instance, derived from unstabilized naphtha. Hydrocarbon distillates stream 116, including straight run distillates 116a and coker distillates 116b, are separated and routed to the hydroprocessing zone 160. The coker recycle stream 112 is the feed to the coking zone 120. It is also to be appreciated that straight run distillates 116a and distillates 116b are identified separately for clarity of exposition; the hydrocarbons are separated by fractional distillation and the distillates, whether derived from the initial feed or the coker gas and liquid products, are comingled within the fractionating tower and discharged from one or more common outlets based on temperature range(s), schematically shown as the combined hydrocarbon distillates stream 116. In certain embodiments stream 116 is a full range stream, for instance from naphtha through vacuum gas oil. In further embodiments, all or a portion of naphtha or light naphtha is separated and treated separately and/or recombined after hydroprocessing of stream 116. In additional embodiments, all or a portion of heavy vacuum gas oil is separated and passed with the coker recycle stream 112.

In certain embodiments, the coker recycle stream 112 contains hydrocarbon components having an initial boiling point corresponding to that of vacuum residue, and the coking zone 120 is part of a delayed coking unit. The coking zone 120 operates to convert at least a portion of the heavy hydrocarbons in the coker recycle stream 112 into distillates.

The combined hydrocarbon distillates stream 116 from the fractionating zone 110 includes distillates 116b from the coking zone 120 and straight run distillates 116a. The combined hydrocarbon distillates stream 116 is hydrotreated/hydrocracked in the hydroprocessing zone 160 over a suitable catalyst system and under effective operating conditions to remove the organosulfur and organonitrogen compounds, and to hydrocrack heavy hydrocarbons from the combined hydrocarbon distillates stream 116 into lighter distillates. In addition to internally recycled hydrogen (not shown), the hydroprocessing zone 160 is supplied with hydrogen 162. In certain embodiments, all, a substantial portion, a significant portion, or a major portion of hydrogen 162 is derived from a hydrogen stream 190 obtained from an integrated gasification zone 180. An optional gasification zone 180 is configured and arranged to process all, a substantial portion, a significant portion, or a major portion of coke 126 from the coking zone 120. If gasification is not employed, or if additional hydrogen is needed, make-up hydrogen 164 from another source is fed to the hydrocracker. Any coke 126, for instance a minor portion thereof, that is not subjected to gasification (or if gasification is not employed) is utilized as fuel or used in other applications. The hydroprocessed liquid hydrocarbon effluent stream 168 from the hydrocracking unit 160 is a desirable low sulfur, low nitrogen distillate stream. In certain embodiments the hydroprocessed liquid hydrocarbon effluent stream 168 is a refined full range hydrocarbon mixture effective as a low sulfur bottomless synthetic crude oil. This mixture can have a sulfur content of less than about 2000, 1500 or 1000 ppmw. In addition, the API gravity can be increased by at least about 5, 7, 10 or 12 degrees.

In certain embodiments, coke 126 from the coking zone 120 is gasified in the gasification zone 180 to produce hydrogen 190 that can be used as all or a portion of the hydrogen required for the hydroprocessing zone 160. For instance, in a batch mode of operation, coke 126 is charged to the gasification zone 180 in batches when it is removed from the coking zone 120. In a continuous or semi-continuous mode of operation, coke 126 is passed to the gasification zone 180 via a transfer line 128. In embodiments in which coke 126 from the coking zone 120 is processed in a gasification zone 180, coke is advantageously disposed of, and useful gases and energy are produced. For instance, gasification of coke produces syngas, which can be further processed using water gas shift reaction to produce hydrogen necessary for the hydrotreating/hydrocracking in the integrated process and system.

Operation of the integrated system and process herein overcomes conventional problems associated with upgrading of heavy oils containing asphaltenes, since they are substantially removed from the system through the coking zone 120 by cracking and forming part of the thermally cracked hydrocarbon products 122. Those asphaltenes that are not cracked form part of the coke 126 by-product. For instance, in the coking zone 120, 1 to 2 times the MCR content (W %) is converted to coke.

In embodiments in which catalyst material 194 is used, suitable catalysts include those having functionality to stabilize the free radicals formed by the thermal cracking and to thereby enhance the thermal cracking reactions. The catalyst material can be in homogeneous oil-soluble form, heterogeneous supported catalysts, or a combination thereof.

In certain embodiments, the catalyst material 194 is a heterogeneous catalyst that can be added to the fractionator bottoms prior coking. Suitable heterogeneous catalyst materials include active metals deposited or otherwise incorporated on a support material. The heterogeneous catalyst materials used in embodiments herein are generally granular in nature, and the support material can be selected from the group consisting of silica, alumina, silica-alumina, titania-silica, molecular sieves, silica gel, activated carbon, activated alumina, silica-alumina gel, zinc oxide, clays (for instance, attapulgus clay), fresh catalyst materials (including zeolitic catalytic materials), used catalyst materials (including zeolitic catalytic materials), and combinations thereof. The active metals of the heterogeneous catalyst material include one or more active metal components of metals or metal compounds (oxides or sulfides) selected from the Periodic Table of the Elements IUPAC Groups 4, 5, 6, 7, 8, 9 and 10. In certain embodiments, the active metal component can be a metal or meta compound (oxides or sulfides) including molybdenum, vanadium, tungsten, chromium or iron. In certain embodiments the active metal component can be selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate and iron naphthenate. In certain embodiments, molybdenum and molybdenum compounds are used as the active component.

The heterogeneous catalyst material is provided in particulate form of suitable dimension, such as granules, extrudates, tablets, spheres, or pellets, may be formed into various shapes such as cylinder, sphere, trilobe, or quatrolobe, possess average particle diameters (mm) of about 0.01-4.0, 0.1-4.0, or 0.2-4.0, pore sizes (nm) of about 1-5,000 or 5-5,000, possess pore volumes (cc/g) of about 0.08-1.2, 0.3-1.2 or 0.5-1.2, in certain embodiments at least 1.0, and possess a surface area of at least about 100 $m^2/g$.

In embodiments in which catalyst material 194 is heterogeneous catalyst material, it can be added upstream of the coking furnace, or in an optional embodiment, downstream of the furnace. A mixing zone such as described for the adsorbent material used in the embodiment of FIG. 2 can be used to mix the catalyst and coker feed. In addition, as catalyst material can be metered or otherwise charged directly to the coking zone 120, or metered or otherwise charged directly to the fractionating zone 110, as noted herein. In embodiments, in which heterogeneous catalyst is used, the amount of catalyst material 194 (ppmw) can be about 1-20,000, 10-20,000, 100-20,000, 1-10,000, 10-10,000, 100-10,000, 1-5,000, 10-5,000, 100-5,000, 1-1,000, 10-1,000 or 100-1,000 relative to the weight of the coker recycle stream 112, and can be determined as is known in the art, for instance based upon factors including the characteristics of the crude oil and its residue, the type of catalyst used and the coking unit operating conditions.

In certain embodiments, a homogenous catalyst is used. For instance, effective homogeneous oil-soluble catalysts include one or more active metal components of metals or metal compounds (oxides, sulfides, or salts of organo-metal complexes) selected from the Periodic Table of the Elements IUPAC Groups 4, 5, 6, 7, 8, 9 and 10. In certain embodiments, homogeneous catalysts are transition metal-based compounds derived from an organic acid salt or an organo-metal compound containing molybdenum, vanadium, tungsten, chromium or iron. In certain embodiments homogeneous catalysts can be selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate and iron naphthenate. In certain embodiments, molybdenum and molybdenum compounds are used.

The homogeneous catalyst can be added upstream of the coking furnace, or in an optional embodiment, downstream of the furnace. Since the catalyst is homogeneous and oil-soluble, it can be added directly to the coking zone or in certain embodiments to the fractionator. If the homogeneous catalyst is prepared from metal oxides or conditioned before use, a separate step is carried for catalyst preparation as is known in the art. The amount of catalyst material (ppmw) can range from 1-10,000, 10-10,000, 100-10,000, 1-5,000, 10-5,000, 100-5,000, 1-1,000, 10-1,000, 100-1,000, 1-100 or 10-100 relative to the weight of the coker recycle stream 112, and can be determined as is known in the art, for instance based upon factors including the characteristics of the crude oil and its residue, the type of catalyst used and the coking unit operating conditions.

Figure 2:
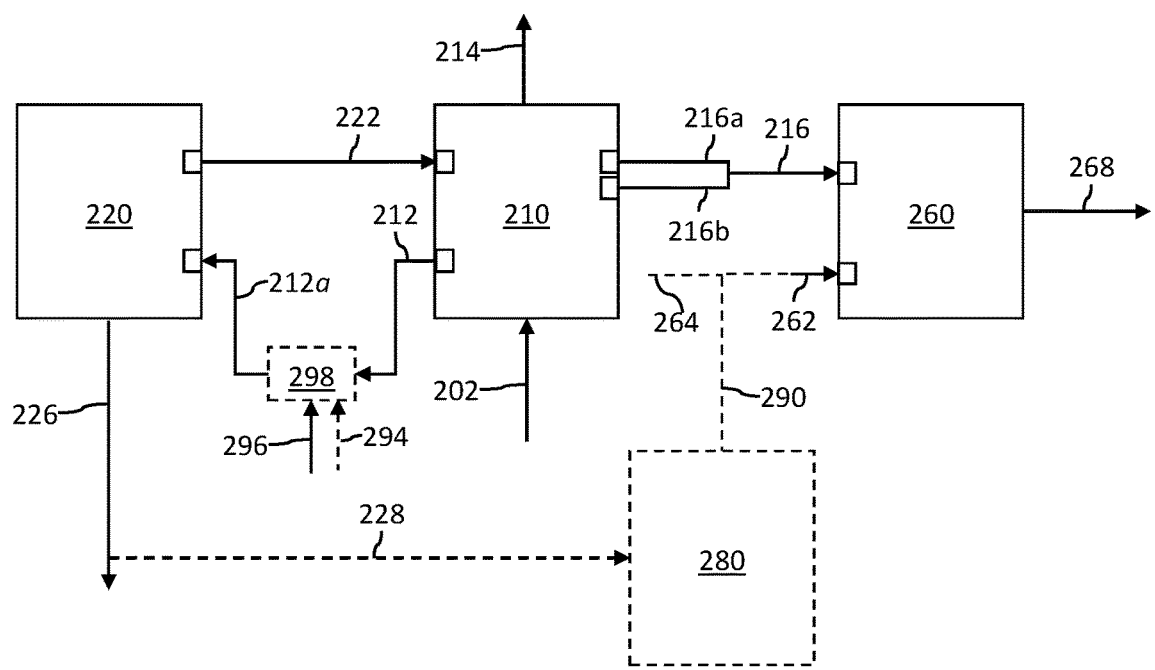
FIG. 2 is a process flow diagram of another embodiment of a system integrating hydroprocessing and adsorbent-assisted coking.

Another system and method provided in certain embodiments introduces adsorbent material in a coking zone. In this regard, the disclosure of commonly owned U.S. Pat. Nos. 9,023,192 and 9,234,146 are relevant and are incorporated by reference herein in their entireties. FIG. 2 is a schematic diagram of a general embodiment of an integrated process and system to upgrade an initial liquid hydrocarbon feedstock such as whole crude oil. It is to be appreciated that features of process and system shown and described with respect to FIG. 2 concerning adsorbent material can advantageously be incorporated in one or more other embodiments described further herein including different types of coker units, embodiments using one or more flash vessels for separation of light gases before fractionating, embodiments using one or more flash vessels for separation of light gases and naphtha before fractionating, and embodiments using integrated heat exchanger(s). The integrated system shown in FIG. 2 generally includes units corresponding to those in FIG. 1 (with similar reference numbers), and therefore the description above applies for those in FIG. 2. The units generally include a fractionating zone 210, a coking zone 220, a hydroprocessing zone 260, and in certain embodiments a gasification zone 280 is integrated (denoted by dashed lines as optional). In addition, adsorbent material 296 is added to the coker feed, for instance, by adding with the coker recycle stream as shown, added to the coking zone, and/or added in the fractionating zone.

The fractionating zone 210 generally includes one or more feed inlets for receiving an initial liquid hydrocarbon feedstock 202, one or more coker inlets for receiving a thermally cracked hydrocarbon products stream 222, one or more light outlets for discharging a light product stream 214, one or more distillate outlets for discharging a hydrocarbon distillates stream 216, and one or more bottoms outlets for discharging a coker recycle stream 212. The coking zone 220 generally includes one or more inlet for receiving the coker recycle stream 212 from the fractionating zone and one or more outlets for discharging a thermally cracked hydrocarbon products stream 222. Typically, sub-systems are provided for removing coke 226, which in certain embodiments is used as feed to the gasification zone 280, for instance via a transfer line 228 or other means. The hydroprocessing zone 260 generally includes one or more inlet for receiving the hydrocarbon distillates stream 216 and one or more outlets for discharging a hydroprocessed liquid hydrocarbon effluent stream 268. Hydrogen for hydrotreating/hydrocracking is shown as stream 262, which includes make-up hydrogen stream 264 and/or hydrogen stream 290 obtained from the gasification zone 280, For example, as shown in FIG. 2, adsorbent material 296 is admixed with the coker recycle stream 212 in a mixing zone 298, such as an in-line mixing apparatus or a mixer, to form a slurry of the coker recycle and adsorbent material shown as stream 212a. In certain optional embodiments (as denoted by dashed lines), a source of catalyst material 294 is provided along with the adsorbent material in fluid or solid communication with the coking zone 220 inlet. The optional catalyst material 294 can be admixed in the same manner as the adsorbent material, or in a different manner. In embodiments in which optional catalyst material is used, the types and quantities of catalyst described with respect to FIG. 1 are applicable. The coking zone 220 is in fluid communication with an outlet of the mixing zone 298 to receive the coker recycle/adsorbent material stream 212*a*.

In other embodiments (not shown) the adsorbent material is admixed with the feedstock by charging directly with the coker recycle stream 212 without a dedicated mixing zone. In further embodiments (not shown) the adsorbent material 296 is introduced separately to the coking zone 220 whereby a source of adsorbent material is provided in particulate communication or fluid communication (in which the adsorbent material is formed in a slurry) with the coking zone 220 inlet. In further embodiments, the fractionating zone is configured for handling of adsorbent material and/or catalyst material, whereby a source of adsorbent material is provided in particulate communication or fluid communication (in which the adsorbent material is formed in a slurry) with the fractionating zone 210, and so that the coker recycle stream 212 contains the adsorbent material and/or catalyst material, for instance as disclosed in commonly owned U.S. Pat. No. 9,023,192, which is incorporated by reference herein in its entirety.

Coke 226, which contains adsorbent material that has adsorbed undesirable contaminants, is recovered from the coking zone 220. To effectively process the coke 226 containing adsorbent material with undesirable contaminants adsorbed thereon or therein, the gasification zone 280 includes a membrane wall type reactor.

In a process using the system shown and described with respect to FIG. 2, operations are similar to those described with respect to FIG. 1, with the addition of adsorbent material to the coker recycle stream as shown, or to the coker zone or the fractionating zone. In the embodiment shown, the coker recycle stream 212 is mixed with the adsorbent material 296, and optionally catalyst material 294, for instance, in a mixing zone 298 that can be a dedicated mixing vessel or an in-line mixing apparatus. A slurry stream 212*a*, a mixture of bottoms from the fractionating zone 210, and adsorbent material, is thermally cracked in the coking zone 220 to produce thermally cracked hydrocarbon products 222 and by-product coke 226. The by-product coke 226 contains adsorbent material having contaminants adsorbed thereon. In certain embodiments (not shown), adsorbent material and/or catalyst material can be metered or otherwise charged directly to the coking zone 220, and accordingly the coker recycle stream 212 is separately charged to the coking zone 220. In certain embodiments (not shown), adsorbent material and/or catalyst material can be metered or otherwise charged directly to the fractionating zone 210, and accordingly the coker recycle stream 212 contains adsorbent material and/or catalyst material.

The use of adsorbent material 296 increases the quality of the thermally cracked distillates by removing some of the undesirable contaminants, for instance by selectively adsorbing sulfur- and/or nitrogen-containing compounds. Handling of adsorbent material that has adsorbed undesirable contaminants largely depends on the type of coker unit deployed. For instance, in delayed coker units, the adsorbent material is deposited with the coke on the inside surface of the coking drum(s). In a fluid coking process, the adsorbent material can pass with the coke particles that are discharged.

The adsorbent material that can be integrated is selected from the group consisting of silica, alumina, silica-alumina, titania-silica, molecular sieves, silica gel, activated carbon, activated alumina, silica-alumina gel, zinc oxide, clays (for instance, attapulgus clay), fresh catalyst materials (including zeolitic catalytic materials), spent catalyst materials (including zeolitic catalytic materials), regenerated catalyst materials (including zeolitic catalytic materials), and combinations thereof. In certain embodiments adsorbent material comprises activated carbon, clays, or mixtures thereof, The material is provided in particulate form of suitable dimension, such as granules, extrudates, tablets, spheres, or pellets, may be formed into various shapes such as cylinder, sphere, trilobe, or quatrolobe, possess average particle diameters (mm) of about 0.01-4.0, 0.1-4.0, or 0.2-4.0, pore sizes (nm) of about 1-5,000 or 5-5,000, possess pore volumes (cc/g) of about 0.08-1.2, 0.3-1.2 or 0.5-1.2, in certain embodiments at least 1.0, and possess a surface area of at least about 100 $m^2/g$. The quantity (weight basis, hydrocarbon to adsorbent) of the solid adsorbent material used in the embodiments herein is about 1000:1-3:1, 200:1-3-1, 100:1-3:1, 50:1-3:1, 20:1-3:1, 1000:1-3:1, 200:1-8:1, 100:1-8:1, 50:1-8:1, 20:1-8:1, 1000:1-3:1, 200:1-10:1, 100:1-10:1, 50:1-10:1 or 20:1-10:1.

The coking zone can operate in accordance with known cokers used in oil refineries, including more commonly delayed coker units, and in certain arrangements a fluid coking process. In general, delayed coker units include plural coking drums operating in bulk liquid phase and in swing mode; when one drum reaches capacity, coke is removed and another is put in operation to thermally crack the feed. Fluid coking processes generally use circulated coke particles for contacting the feed, whereby coking occurs on the surface of the coke particles.

In general, coking operations are carbon rejection processes that are used to convert lower value atmospheric or vacuum distillation residue streams. These streams are conventionally from a dedicated crude oil distillation unit, for instance, an arrangement of an atmospheric distillation tower and a vacuum distillation tower, to obtain a vacuum residue fraction as a typical feedstock to a coking unit. Coking of residuum from heavy high sulfur, or sour, crude oils is carried out primarily as a means of utilizing such low value hydrocarbon streams by converting part of the material into those more valuable liquid and gas products. The treatment of coke varies depending on the type of coking process and the quality of the coke. In certain embodiments, for instance with delayed coking units, resulting coke is removed from drums, and is generally treated as a low value by-product or recovered for various uses depending upon its quality. In a fluid coking unit, coke is removed as particles and a portion is recycled to provide hot surfaces for thermal cracking.

Figure 3:
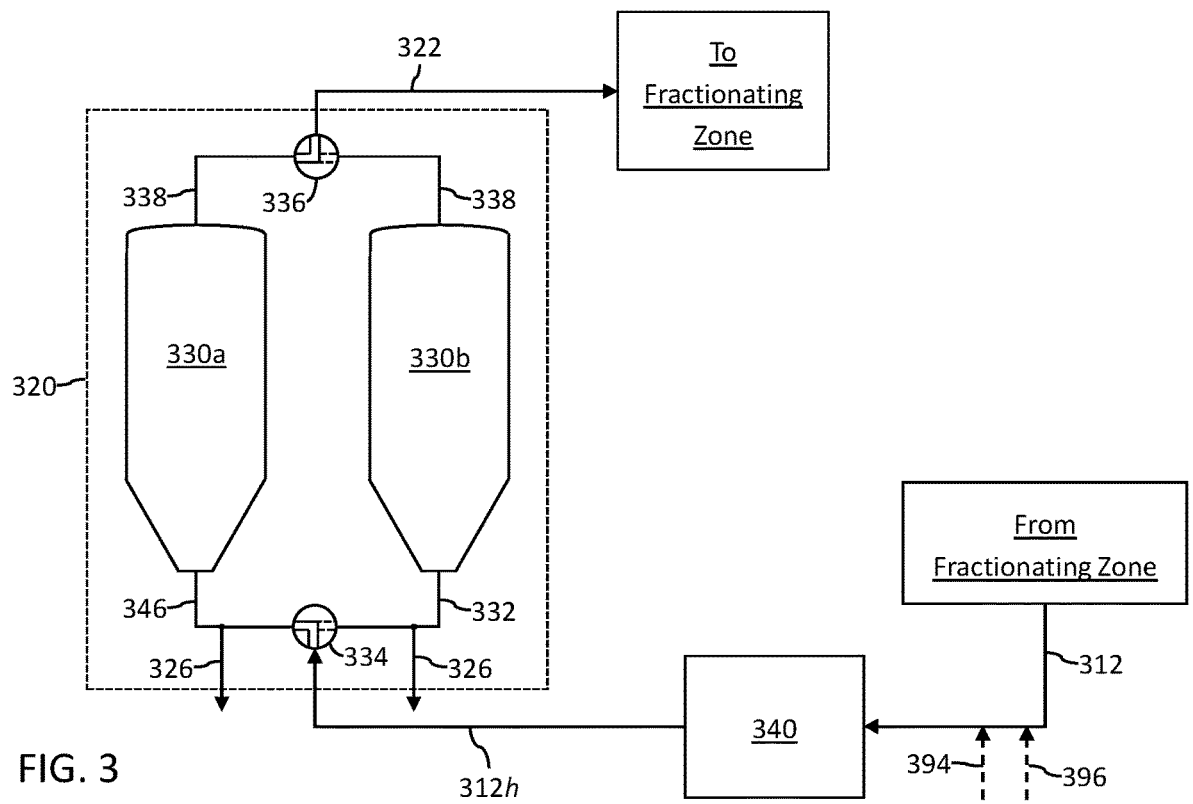
FIG. 3 is a process flow diagram of a delayed coking operation.

A portion of a delayed coking operation is schematically depicted in FIG. 3, which can be the coking unit in certain embodiments of the system and process herein. A coking zone 320 is shown including parallel drums 330*a* and 330*b*), drum inlet conduits 332 and an inlet control valve 334 on the inlet side, and an outlet control valve 336 and drum outlet conduits 338 on the outlet side. A thermally cracked product stream 322 is recovered from the drum outlet conduits 338 and is in fluid communication with the fractionating zone. A coking furnace 340 is included having an inlet in fluid communication with an outlet of the fractionating zone to receive a coker recycle stream 312, and an outlet which is in fluid communication with the inlet side of the coking zone 320 to charge a heated coker recycle stream 312*h*.

In operation of the delayed coker, the coker recycle stream 312 and steam are introduced into the coking furnace 340 for heating to a predetermined temperature or temperature range, for instance, typically at about the coking temperature in delayed coking configurations. The temperature of the heated coker recycle stream 312*h* is closely monitored and controlled in the furnace utilizing appropriately positioned thermocouples, or other suitable temperature-indicating sensors (not shown) to avoid or minimize the undesirable formation of coke in the tubes of the furnace. The sensors and control of the heat source, e.g., open flame heaters, can be automated as is known to those of skill of the art. For example, in known delayed cokers, a fired furnace or heater with horizontal tubes is used to reach thermal cracking temperatures, for instance, in the range of about 425-650, 425-530, 425-510, 425-505, 425-500, 450-650, 450-530, 450-510, 450-505, 450-500, 480-650, 480-530, 480-510, 480-505 or 480-500° C. With a short residence time in the furnace tubes of the coking furnace 340, and with addition of steam, coking of the feed material on the furnace tubes is minimized or obviated, and coking is thereby "delayed" until it is discharged into relatively larger coking drums 330a or 330b) downstream of the heater. In addition, the necessary heat for coking is provided in the coking furnace 340.

The flow of the heated coker recycle stream 312h from the coking furnace 340 is directed into one of the coking drums 330a or 330b) via feed line 332 by adjustment of inlet control valve 334, for instance, a three-way valve. The coking unit process is preferably conducted as a semi-continuous process by providing at least two vertical coking drums that are operated in swing mode. This allows the flow through the tube furnace to be continuous. The feedstream is switched from one to another of the at least two drums. In a coking unit with two drums, one drum is on-line filling with coke while the other drum is being steam-stripped, cooled, decoked, pressure checked and warmed up. The overhead vapors from the coke drums flow from the drum used for thermal cracking to the fractionating zone in a continuous manner.

The coke drum is maintained at coking conditions of temperature and pressure where the feed decomposes or cracks to form coke and volatile components. The volatile components are recovered as vapor and transferred to the coking unit product fractionator. In certain embodiments, heavy gas oil from the fractionator is added to the flash zone of the fractionator to condense the heaviest components from the coking unit product vapors. The heaviest fraction of the coke drum vapors can be condensed by other techniques, such as heat exchange. In certain embodiments, as in commercial operations, incoming vapors can be contacted with heavy gas oil in the coking unit product fractionator. Conventional heavy recycle oil includes condensed coking unit product vapors and unflashed heavy gas oil.

When a drum 330a or 330b contains the predetermined maximum amount of coke, the control valve 334 is adjusted to direct the heated coker recycle stream 312' into the other drum 330b or 330a. Substantially at the same time, coking drum outlet valve 336 is adjusted so that the liquid and gas products are discharged through a line 338 as the thermally cracked product stream 322 that is passed to the fractionating zone. Any hydrocarbon vapors remaining in the coke drum are removed by steam injection. Coke that is subsequently removed from a drum when it is out of service is schematically represented as line 326. Typically, coke is cooled with water and then removed from the coke drum using hydraulic and/or mechanical cutters while that coking drum is temporarily decommissioned.

The operating temperature (° C.) in the coking drums 330 can range from about 425-650, 425-510, 425-505, 425-500, 450-650, 450-510, 450-505, 450-500, 485-650, 485-510, 485-505, 485-500, 470-650, 470-510, 470-505 or 470-500. The operating pressure (kg/cm²) in the coking drum is mildly super-atmospheric, for instance of about 1-20, 1-10 or 1-3. In certain embodiments of the process, steam is introduced with the heated residue into the coking furnace, for instance in an amount of about 1-3 wt % of the heated residue, to increase the velocity in the tube furnace, and to reduce the partial pressure of the feedstock oil in the drum. The steam also serves to increase the amount of gas oil removed from the coke drums. Steam also assists in decoking of the tubes in the event of a brief interruption of the feed flow. The coking in each drum can occur in cycles, for instance, in the range of about 10-30, 10-24, 10-18, 12-30, 12-24, 12-18, 16-30, 16-24 or 16-18 hours.

Figure 4:
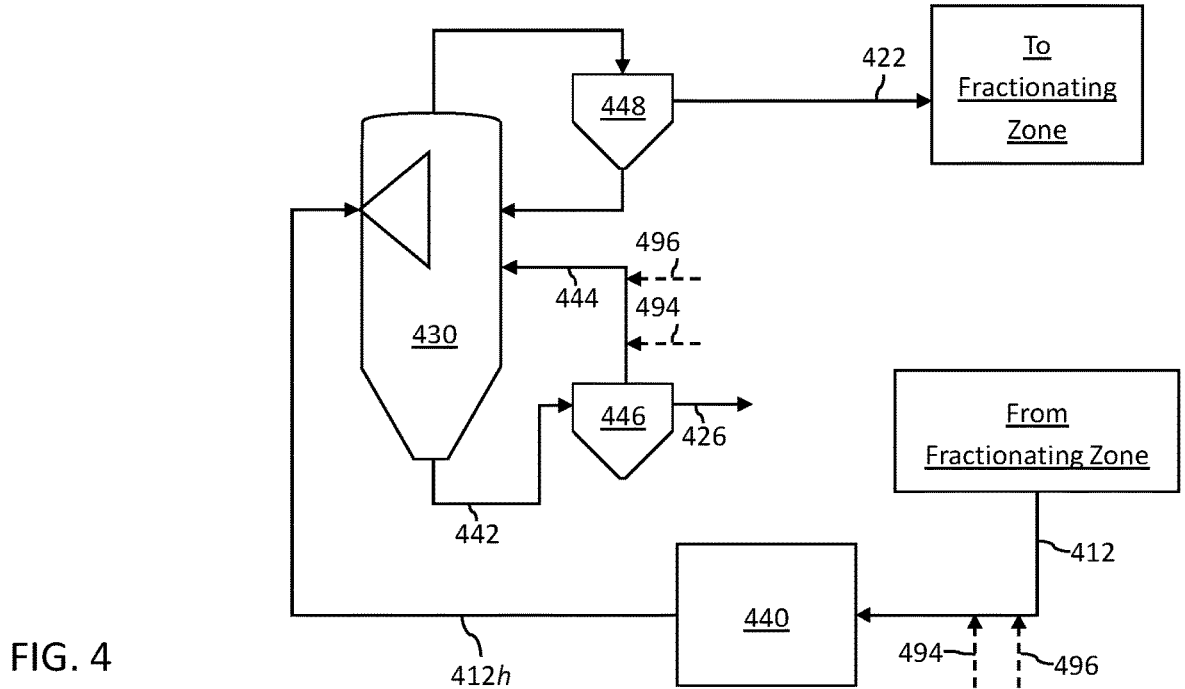
FIG. 4 is a process flow diagram of a fluid coking operation.

In certain embodiments, a fluid coking process is used. A portion of a fluid coking operation is schematically depicted in FIG. 4, which can be the coking unit in certain embodiments of the system and process herein. Note that the general schematic of FIG. 4 also is similar to a Flexicoking™ process commercially available from ExxonMobil, in which all or a portion of coke is gasified to produce fuel gas.

A coking drum 430 includes one or more inlets that receive a heated feedstream, 412h for instance, by spraying. A portion of the coke effluent 442, in particle form, is discharged via one or more outlets, and is in fluid or particulate communication with a coke combusting zone 446. Heated coke 444 is discharged from one or more outlets of the coke combusting zone 446, and is in fluid or particulate communication with one or more inlets of the coking drum 430. In addition, coker liquid and gas products are recovered as a thermally cracked product stream 422 from one or more outlets of the coking drum 430, generally through a separation zone 448 for recovery of fine coke particles. A coking furnace 440 is included having an inlet in fluid communication with an outlet of the fractionating zone to receive a coker recycle stream 412, and an outlet which is in fluid communication with the inlet side of the coking drum 430 to charge the heated coker recycle stream 412h.

In operation of the fluid coking unit, the coker recycle stream 412 and steam are introduced into the coking furnace 440 for heating to a predetermined temperature or temperature range, for instance, typically at about the coking temperature in delayed coking configurations. The temperature of the heated coker recycle stream 412h is closely monitored and controlled in the furnace utilizing appropriately positioned thermocouples, or other suitable temperature-indicating sensors (not shown) to avoid or minimize the undesirable formation of coke in the tubes of the furnace. The sensors and control of the heat source, e.g., open flame heaters, can be automated as is known to those of skill of the art. For example, a fired furnace or heater with horizontal tubes is used to reach temperature levels that are at or below thermal cracking temperatures, for instance, in the range of about 425-650, 425-570, 425-525, 450-650, 450-570, 450-525, 485-650, 485-570 or 485-525° C. With a short residence time in the furnace tubes of the coking furnace 440, and with addition of steam, coking of the feed material on the furnace tubes is minimized or obviated. In the fluid coking unit, coking occurs on coke particles in the coker reactor 430. Further, additional heat for coking is provided by recirculating combusted heated coke particles 444 in the coking drum 430.

All or a portion of the coke product 442 is burned to provide additional heat for coking reactions to the feed into gases, distillate liquids, and coke. Coking occurs on the surface of circulating coke particles of coke. Coke is heated by burning the surface layers of accumulated coke in the coke combustion zone 446, by partial combustion of coke produced. The products of coking are sent to the fractionating zone after recovery of fine coke particles in a separation zone 448. Steam can also be added at the bottom of the reactor (not shown), for instance, in a scrubber to add fluidization and to strip heavy liquids sticking to the surface of coke particles before they are sent to the burner.

Coke is deposited in layers on the fluidized coke particles in the reactor. Air is injected into the burner for combustion to burn a portion of the coke produced in the reactor. A portion of the combusted particles are returned to the reactor as heated coke 444, and the remainder is drawn out as coke 426.

The operating temperature (° C.) in the coking drum 430 can range from about 450-760, 450-650, 450-570, 470-760, 470-650, 470-570, 510-760, 510-650 or 510-570. The operating pressure ($kg/cm^2$) in the coking drum 430 is mildly super-atmospheric, for instance of about 1-20, 1-10 or 1-3. In certain embodiments of the process, steam is introduced with the heated residue into the coking furnace, for instance in an amount of about 1-3 wt %.

In certain embodiments, adsorbent material is used in the coker zone, such as described with respect to FIG. 2. In further optional embodiments, with or without adsorbent material, catalyst material can be introduced, as described above. For instance, adsorbent material can be included in the coker recycle stream 312 or 412. In further embodiments, adsorbent material 396 or 496, and/or catalyst material 394 or 494, can be added to the fractionator bottoms coker recycle stream 312 or 412, for instance, in a manner similar to stream 212a in FIG. 2. In alternative embodiments, adsorbent material can be introduced after the furnace (not shown). In additional embodiments, for instance when coking is with a fluid coking process, adsorbent material and/or catalyst material 494 can be added with the recirculated heated coke stream 444, for instance, after combustion as shown, or in certain embodiments before or during combustion. The slurry of adsorbent material and/or catalyst material, and the coker recycle stream, can be charged directly into the coking unit furnace, or in certain embodiments into a storage tank from which it is metered (not shown) into the coking unit furnace. The slurry is heated to a predetermined coking temperature and then is passed as a heated coker recycle stream 312h or 412h to the coking drum, for instance one of 330a or 330b to produce the delayed coking product stream 322, or to coker reactor 430 to produce the delayed coking product stream 422. In delayed coking embodiments, adsorbent material having adsorbed sulfur and/or nitrogen compounds, and/or catalyst material in embodiments in which heterogeneous catalyst materials are used, is deposited with the coke on the interior surface of the delayed coking drums 330a or 330b. The delayed coking product stream has a reduced content of the sulfur and/or nitrogen compounds corresponding to those deposited with the coke in the drum. In fluid coking embodiments, the adsorbent material having adsorbed sulfur and/or nitrogen compounds, and/or catalyst material in embodiments in which heterogeneous catalyst materials are used, is passed with the coke effluent 442, and in certain embodiments fine particles pass with the coker liquid and gas products stream 422.

Figure 5:
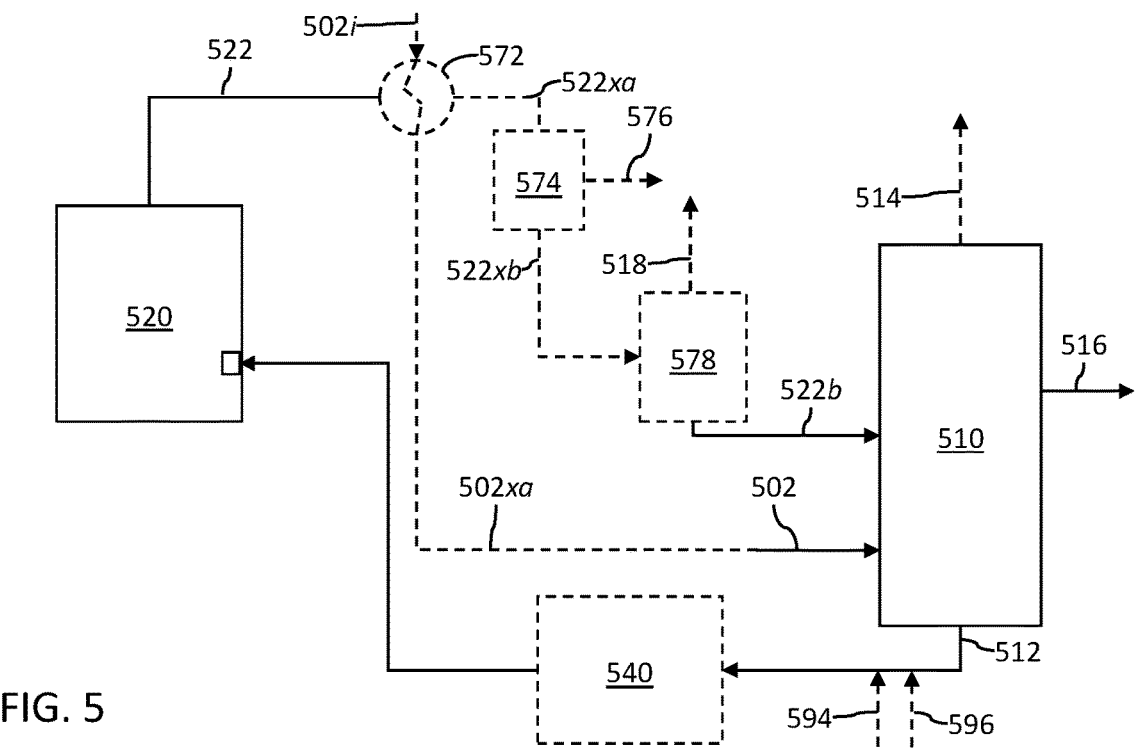
FIG. 5 is a process flow diagram of an embodiment of a system integrating hydroprocessing and coking and including one or more heat exchangers and/or a flash vessel.

In certain embodiments, and with reference to FIG. 5, one or more heat exchangers 572 and/or 574 are provided, and are configured and arranged to recover heat from the thermally cracked product stream 522. For example, a heat exchanger 572 is included in fluid communication with the outlet side of the coking zone 520 to receive thermally cracked product stream 522, and in fluid communication with the fractionating zone 510 to pass the cooled thermally cracked product stream 522xa. The heated fluid can be the feedstock, so that the heat exchanger 572 is in fluid communication with a source of feedstock 502i, and in fluid communication with the fractionating zone 510 to pass the heated feedstock 502xa. For example, the thermally cracked product stream is decreased in temperature, for instance, from a range of about 450-500° C. for stream 522 to a range of about 200-250° C. for stream 522xa, and the feedstock is increased in temperature, for instance, from a range of about 20-45° C. for stream 502i to a range of about 200-250° C. for stream 502xa.

Alternatively, or in addition, a heat exchanger 574 is included in fluid communication with the outlet side of the coking zone 520 and another fluid, such as water, to create process steam 576. The heat exchanger 574 can receive the thermally cracked product stream 522, or if the heat exchanger 572 is used, the partially cooled thermally cracked product stream 522xa, and discharges a cooled thermally cracked product stream 522xb.

In additional optional embodiments, in combination with or excluding one or both of the heat exchangers 572, 574, a flash vessel 578 is included. The flash vessel 578 is in fluid communication with the outlet side of the coking zone 520 to receive thermally cracked product stream 522 (or cooled thermally cracked product stream 522xa, or cooled thermally cracked product stream 522xb, if the corresponding heat exchanges are used) and is in fluid communication with the coking unit fractionator 510 to pass the relatively heavier portion 522b of the thermally cracked product stream 522 from the flash vessel 578. The flash vessel 578 operates at suitable cut point, for instance, to discharge a light gas stream 518 including $H_2$, $H_2S$, $NH_3$ and $C_1$ to $C_4$ hydrocarbons. In certain embodiments, all or a portion of naphtha or light naphtha can be separated with the flash vessel 578.

In certain embodiments the flash vessel 578 is provided downstream of the coking zone 520 to enhance the separation of the coker product stream. The flash unit operating conditions are determined on the basis of the product separation required. The products can be flashed at the coker unit's outlet temperature or at lower temperatures, provided that the coker products are cooled. The cooling can be provided by heat exchange with the whole crude oil feedstock as described herein, and/or by air coolers and/or water coolers. Depending upon the temperature of the coker product stream, the flash temperature can range from 45° C.-496° C. The pressure of the flash unit is less than the coker outlet pressure, for instance, 1-3 Kg/cm', taking into consideration pressure drop in the equipment.

The fractionating zone 510 can operate similar to that described with respect to FIGS. 1 and 2, that is, discharging a light product stream 514, a distillates stream 516 and a coker recycle stream 512. In certain embodiments, the light product stream 514 can be excluded, or used for discharging hydrocarbons in the naphtha range or light naphtha range and below, whereby lighter gases are discharged as gases 518.

In certain optional embodiments (not shown), all or a portion of the cracked effluent and initial feed can be mixed in conjunction with or instead of cross-exchanging the fluids for heat transfer, since they are separated in the same unit. Heat transfer can commence at the mixing, with the mixture passing as stream 502.

The initial liquid hydrocarbon feedstock that is charged to the fractionator described herein, in certain embodiments heated through one or more heat exchangers or heating furnaces, is selected from crude oil, bitumens (for instance, API gravity of about 10°), oil sand, shale oil, heavy hydrocarbon liquids derived from coal, heavy hydrocarbon liquids derived from biomass derived, and combinations thereof. In certain embodiments the initial liquid hydrocarbon feedstock is crude oil. In certain embodiments the initial liquid hydrocarbon feedstock is heavy crude oil feed having an API gravity in the range of about 10-35 or 10-30 degrees. The systems and methods herein are effective for heavy crude oils including those having high metal content, such as more than 10 ppmw or more than 50 ppmw.

The fractionating zone, such as 110 or 210 described herein, includes design features to enable separation of its different feeds, including the initial feedstock, and all or a portion of the cracker products from the coking drums/vessels. Components of the fractionating zone that are not shown in certain embodiments but which are well-known can include feed/product and pump-around heat exchangers, charge heater(s), product strippers, cooling systems, hot and cold overhead drum systems including re-contactors and offgas compressors, and units for water washing of overhead condensing systems. Steam is typically injected to prevent cracking of heated feed.

In certain embodiments, one or more flash vessels can be used as the fractionating zone. For instance, a first can separate gases, and in certain embodiments naphtha or light naphtha, and a second to separate the hydroprocessing feed and the coker recycle stream.

The feeds to the fractionating zone, the initial liquid hydrocarbon feedstock 112 or 212, and the thermally cracked products 122 or 222, can be introduced at different locations in the columns as is known. The effluents include the light product streams 114 or 214, hydrocarbon distillates 116 or 216, and the coker recycle stream 112 or 212. The light product streams typically include gases $H_2$, $H_2S$, $NH_3$ and $C_1$ to $C_4$ hydrocarbons. In certain embodiments the light product stream also includes hydrocarbons at or below the naphtha or light naphtha range, for instance, discharged as overhead gases and condensed in a separate vessel. Hydrocarbon distillates include straight run distillates from the initial feed, which includes for instance hydrocarbons through the vacuum gas oil boiling point range, and coker distillates 116*b*, which includes for instance coker gas oil. The coker recycle stream can correspond to that of a conventional vacuum residue (for instance, having an initial boiling point in the range of about 510-565° C.). In certain embodiments the coker recycle stream can include lower boiling hydrocarbons, such as those in the heavy vacuum gas oil range or above, in certain embodiments having an initial boiling point in the range of about 450-510, 470-510 or 482-510° C.

In certain embodiments, the hydrocarbon distillates that are passed to the hydroprocessing zone contains hydrocarbons having a boiling range upper limit corresponding to the coker recycle stream. In certain embodiments, the hydrocarbon distillates that are passed to the hydroprocessing zone includes the full distillate range from the crude oil (corresponding to straight run naphtha, straight run kerosene and all or a portion of straight run gas oil including VGO) and the full range of the coker liquid products (coker naphtha, coker kerosene, coker LGO and all or a portion of coker HGO). In other embodiments, all, a substantial portion, a significant portion, or a major portion of naphtha or light naphtha is removed prior to hydroprocessing. Any naphtha not subject to the hydroprocessing zone can be recombined with hydroprocessing products as is, or after naphtha hydrotreating as is conventionally known, to form a bottomless synthetic crude oil product.

As described above, a gasification zone can be integrated to dispose of the coke, and to also produce synthesis gas, or syngas, steam and electricity. In certain embodiments syngas can be further processed to recover hydrogen that can be used in the integrated hydroprocessing zone. The gasification zone can include a refractory wall or membrane wall type unit, depending, for instance, upon the feedstock, and hydrogen production requirement and usage. In embodiments in which solid adsorbents and/or heterogeneous catalysts are utilized in the coking zone, membrane wall type gasifier units are effective. These solid adsorbents and/or heterogeneous catalysts benefit the membrane wall type gasifier operation as it provides cooling at the reactor walls. A portion of the coker recycle stream can also be routed to the gasification unit.

For example, in embodiments in which coke from delayed coking drums is used, after removal of the solid coke from the coking unit drum, it is processed to reduce it to a particulate form that is within a desired particle size range. The ground coke can include very fine particles, i.e., "dust", when it is introduced into the reactor either alone or with the residual oil, with a carrier gas, or gases, or other liquid(s). In certain embodiments, the ground coke passes a 35 mesh Tyler screen. In other embodiments, the ground coke passes a 70 mesh Tyler screen. In certain embodiments, the coke has an ash content of at least about 2% by weight. The requirement for a relatively high ash content allows a lower grade of coke to be used.

The gases produced by the partial oxidation of the feedstock, fuel and limited oxygen introduced into the reactor combustion chamber contact the water-cooled tubular side walls and the vaporized slag is condensed and forms a layer which partially solidifies on a relatively thin refractory coating applied to the tubes; the remaining molten slag flows downwardly under the force of gravity to the lower end of the walls where it collects and is eventually removed from the reactor.

In certain embodiments of the invention, the ground coke particles are mixed with water to form a uniform pumpable slurry that is introduced under pressure into the membrane wall reactor. This embodiment is used when a combustion modifier is required to properly balance the reactants to obtain the desired quality of the syngas.

The ground coke particles can also be introduced in the form of a free-flowing fluidized feedstream into the combustion chamber of a tubular wall membrane partial oxidation gasification reactor in the presence of a predetermined amount of oxygen, or oxygen-containing gas, for example, air, a fuel gas carrier such as methane, an inert gas, such as nitrogen, argon, or carbon dioxide, or a combination thereof.

The solid particulate coke can also be fluidized in a stream of air or another oxygen-containing process gas in order to support the combustion required for partial oxidation. In certain embodiments, inert gases such as nitrogen, argon or carbon dioxide, are used to fluidize the solid particulate coke. In further embodiments, carbon dioxide for fluidization is recycled from the water-gas shift reaction zone. The solid particulate material can be maintained in a feed reservoir, e.g., a pressurized hopper and metered, as by a screw conveyer into a conduit through which the pressurized gas stream is passing on its way to the membrane reactor. In alternative embodiments, the ground coke particles can be fluidized with an available fuel gas obtained from another refinery unit operation.

Other apparatus and systems for producing either a wet or dry fluidized stream of the coke particles that are well known in the material handling arts can be used. For example, the coke solids can be fed to a high-temperature processing vessel without interruptions caused by bridging and plugging by the solids by passing the solids at a controlled rate from a feed vessel to a first conduit communicating with the feed vessel. The solids are then passed through the first conduit into a second conduit which communicates with the first conduit and the processing vessel, and which contains a scraper for scraping the inside walls of the conduit. The pressure in the feed vessel is maintained at a level higher than the pressure in the processing vessel by passing a sufficient amount of a gas into the feed vessel such that the solids are passed through the second conduit into the processing vessel in a dense phase pneumatic flow as the scraper contacts the inside walls of the second conduit to prevent any bridging or plugging. The scraper can include a wire helix which is rotated inside the second conduit. See for example, U.S. Pat. No. 4,668,130, the disclosure of which is incorporated herein by reference.

Figure 6:
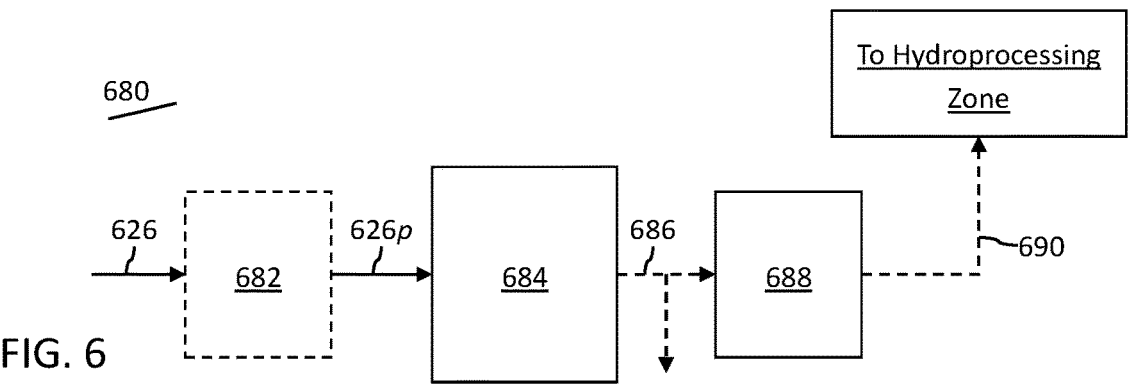
FIG. 6 is a process flow diagram of a gasification zone.

In general, a gasification zone 680 is shown in FIG. 6 as incorporated in the systems and processes described herein. The raw coke from the coker zone, shown as line 626, is optionally processed, for instance, in a crusher 682, to reduce it to a particulate form that is within a desired particle size range. In certain embodiments, when the coke is discharged from the coker zone, this step can be eliminated. The coke particles 626*p*, are introduced into a gasification reactor 684 with controlled amounts of oxygen and steam. The produced ash component contacts the interior vessel walls to form solid and liquid slag at the surface which is eventually recovered, and syngas 686. In certain embodiments, syngas can be recovered as is. In further embodiments, the syngas is subjected to a water-gas shift in a reaction zone 688. In general, steam is mixed with the syngas, and the carbon monoxide component of the syngas reacts with the water molecules in the steam to produce hydrogen and carbon dioxide. The hydrogen is recovered as stream 690 that can be routed to the hydroprocessing zone integrated herein for upgrading the full range coker distillation products.

In general, the operating conditions for a membrane wall gasification reactor include a temperature of about 900-1800 or 1200-1800° C.; a pressure of about 20-100, 20-70, 30-100, 30-70, 40-100 or 40-70; a mole ratio of oxygen-to-carbon content of the feedstock of about 0.1:1 to 2:1, 0.5:1 to 2:1 or 1:1 to 2:1; a mole ratio of steam-to-carbon content of the feedstock of about 0.1:1 to 10:1, 0.1:1 to 2: or 0.4:1 to 0.6:1.

A water-gas shift reaction vessel can be used to convert carbon monoxide to hydrogen through the water-gas shift reaction represented by $CO+H_2O \rightarrow CO_2+H_2$, to thereby increase the volume of hydrogen in the shifted syngas. The water-gas shift reaction can occur at a temperature of about 150-400° C.; a pressure of about 1-60 bars; and a mole ratio of water-to-carbon monoxide of about 5:1 to 3:1.

In general, hydrocracking processes break the carbon-carbon bonds in feed molecules into simpler molecules (e.g., light hydrocarbons) having higher average volatility and economic value. Additionally, hydrocracking processes typically improve the quality of the hydrocarbon feedstock by increasing the hydrogen-to-carbon ratio and by removing organo-sulfur and organo-nitrogen compounds. The significant economic benefit derived from hydrocracking processes has resulted in substantial development of process improvements and more active catalysts.

Hydrocracking units generally include two principal zones, a reaction zone and a separation zone. In addition, there are three commonly used process configurations, including single stage, series-flow (also called once-through) with and without recycle, and two stage with recycle. Key parameters such as feedstock quality, product specification/processing objectives and catalyst selection typically determine the reaction zone configuration. In certain embodiments of the processes and systems disclosed herein, a hydrocracking separation zone or fractionator is avoided when the product is bottomless synthetic crude oil. In other embodiments, the known configuration with a hydrocracking fractionator is used and individual distillate fractions are recovered. In further embodiments, a modified hydrocracking fractionator is used to produce a bottomless synthetic crude oil product.

The hydroprocessing zone can, as is known, contain one or more fixed-bed, ebullated-bed, slurry-bed, moving bed, continuous stirred tank (CSTR), or tubular reactors, in series and/or parallel arrangement. The hydroprocessing reaction zone can operate as a single stage, once-through (with and without recycle) or two-stage with recycle, as are conventionally known. The hydroprocessing zone includes the requisite reaction vessel(s), feed heaters, heat exchangers, hot and/or cold separators, product fractionators, strippers, and/or other units to process the distillates, that is, distillate streams 116 or 216 described herein.

The reactor(s) are generally operated under conditions effective for the desired degree of treatment and conversion of the feed, the particular type of reactor, the feed characteristics, and the desired product slate. In certain embodiments, the components of the hydrocracking zone feed in the range of 520° C. and above are converted to extinction, and the components of the hydrocracking zone feed in the range of 370–520° C. are converted to products boiling in the range of less than 370° C. is in the range of about 10-95, 30-95, 40-95, 10-80, 30-80, 40-80, 10-60, 30-60 or 40-60 W %. In general, suitable conditions include a reaction temperature (° C.) of about 300-500, 330-500, 300-475, 330-475, 300-475 or 330-450; a total reaction pressure (bar) of about 60-300, 60-200, 60-180, 70-300, 70-200, 70-180, 100-300, 100-200, 100-180, 130-300, 130-200, or 130-180; a hydrogen feed rate up to about 2500 standard liters per liter of hydrocarbon feed (SLt/Lt), in certain embodiments from about 500-2500, 500-2000, 500-1500, 800-2500, 800-2000, 800-1500, 1000-2500, 1000-2000, or 1000-1500; and a feed rate, liquid hourly space velocity ($h^{-1}$) of about 0.1-10.0, 0.1-5.0, 0.1-4.0, 0.1-2.0, 0.25-10.0, 0.25-5.0, 0.25-4.0, 0.25-2.0, 0.5-10.0, 0.5-5.0, 0.5-4.0, or 0.5-2.0.

Effective catalysts used in reactor(s) of the hydroprocessing zone possess hydrotreating (hydrodesulfurization, hydrodenitrification and/or hydrodemetallization) functionality and hydrocracking functionality to remove sulfur, nitrogen and other contaminants, and to convert refined and partially cracked feedstocks into lighter fractions. Suitable catalysts contain one or more active metal components of metals or metal compounds (oxides or sulfides) selected from the Periodic Table of the Elements IUPAC Groups 6, 7, 8, 9 and 10. One or more active metal component(s) are typically deposited or otherwise incorporated on a support, which can be amorphous and/or structured, such as alumina, silica-alumina, silica, titania, titania-silica, titania-silicates, or zeolites. Combinations of active metal components can be composed of different particles/granules containing a single active metal species, or particles containing multiple active species. For example, effective hydrotreating/hydrocracking catalysts include one or more of an active metal component selected from the group consisting of cobalt, nickel, tungsten, molybdenum (oxides or sulfides), incorporated on acidic alumina, silica alumina, zeolite or a combination thereof. In embodiments in which zeolites are used, they are conventionally formed with one or more binder components such as alumina, silica, silica-alumina and mixtures thereof. In certain embodiments in which an objective is hydrodenitrification and treatment of difficult feedstocks such as demetallized oil, the supports are acidic alumina, silica alumina or a combination thereof. In embodiments in which the objective is hydrodenitrification and increased hydrocarbon conversion, the supports are silica alumina, or a combination thereof. Silica alumina is useful for difficult feedstocks for stability and enhanced cracking, and can be provided in a ratio (mass ratio relative to the remaining components of the support) in the range of about 20-90, 30-90, 50-90, 20-80, 30-80, 50-80, 20-70, 30-70 or 40-70 mass %. In certain embodiments, the catalyst particles have a pore volume in the range of about (cc/gm) 0.15-1.70, 0.15-1.50, 0.30-1.50 or 0.30-1.70; a specific surface area in the range of about (m2/g) 100-900, 100-500, 100-450, 180-900, 180-500, 180-450, 200-900, 200-500 or 200-450; and an average pore diameter of at least about 45, 50, 100, 200, 500 or 1000 angstrom units. The active metal component(s) are incorporated in an effective concentration, for instance, in the range of (wt % based on the mass of the oxides, sulfides or metals relative to the total mass of the catalysts) about 1-40, 1-30, 1-10, 1-5, 2-40, 2-30, 2-10, 3-40, 3-30 or 3-10. In certain embodiments, the active metal component(s) include one or more of cobalt, nickel, tungsten and molybdenum, and effective concentrations are based on all the mass of active metal components on an oxide basis. In certain embodiments, one or more beds are provided in series in a single reactor or in a series of reactors. For instance, a first catalyst bed containing active metals on silica alumina support is provided for hydrodenitrogenation, hydrodesulfurization and hydrocracking functionalities, followed by a catalyst bed containing active metals on zeolite support for hydrocracking functionality.

In certain embodiments, the catalyst and/or the catalyst support is prepared in accordance with U.S. Pat. No. 9,221,036 and its continuation U.S. Pat. No. 10,081,009 (jointly owned by the owner of the present application, and subject to a joint research agreement), which is incorporated herein by reference in their entireties, includes a modified USY zeolite support having one or more of Ti, Zr and/or Hf substituting the aluminum atoms constituting the zeolite framework thereof. For instance, the catalyst effective for deep hydrogenation include an active metal component carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with about 0.1-5, 0.1-2, 0.5-5, 0.5-2, or about 1 mass % zirconium atoms and about 0.1-5, 0.1-2, 0.5-5, 0.5-2, or about 1 mass % titanium ions calculated on an oxide basis.

Advantageously, the crude oil can be upgraded to provide a bottomless synthetic crude oil, with the residue removed, therefore making the overall stream low in sulfur, metal and asphaltenes content, and also without the light gases. Accordingly, a synthetic light and sweet crude oil can be produced from a heavy crude oil. This bottomless synthetic crude oil can in certain embodiments replace an initial feed to a refinery, for instance, not equipped to handle heavy and/or sour crude oil. In certain embodiments, the processes and systems herein can be used as an upgrader facility to improve the transportability, for instance, to upgrade the crude oil to a lighter synthetic crude oil for pipeline transport. In other embodiments, bottomless synthetic crude oil produced as described herein can be blended with a conventional crude oil feedstream that is processed conventionally elsewhere to reduce the average API gravity, sulfur content, nitrogen content, metal content, and viscosity, and brings flexibility to the upgrader.

EXAMPLE

1000 Kg of Arab heavy crude oil is topped in delayed coker fractionator to yield distillates and vacuum residue. The properties of whole crude oil and its fractions are given in Table 1. The vacuum residue fraction is sent to the delayed coking unit to thermally crack the residue fraction to obtain distillates and a by-product coke. The combined straight run and thermally cracked distillates are hydrocracked in a hydrocracker unit operating at 360° C., 115 bars of hydrogen partial pressure, overall liquid hourly space velocity of 0.5 $h^{-1}$ over Ni—Mo promoted amorphous hydrocracking catalyst and zeolite catalyst at a loading ratio of 1:1.

Figure 7:
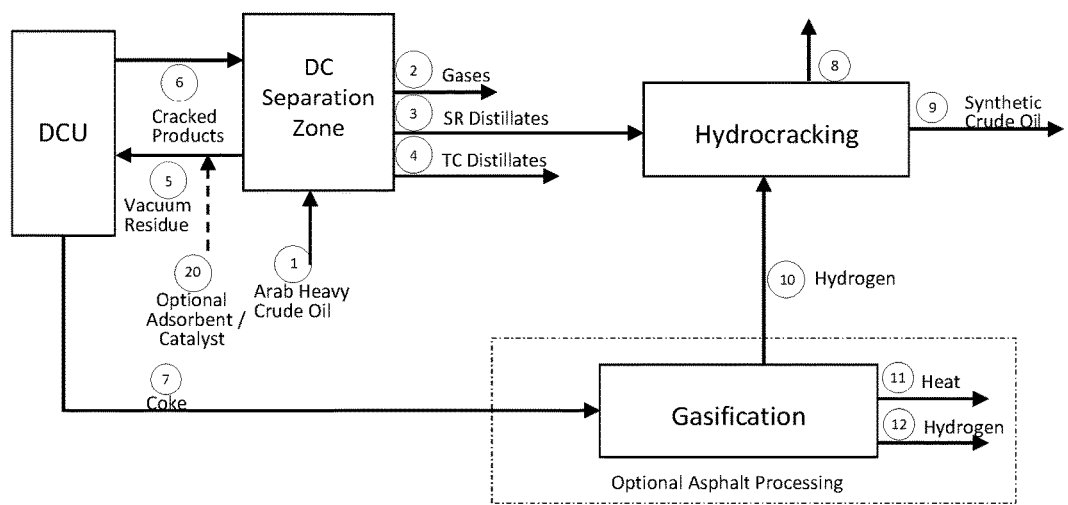
FIG. 7 is a process flow diagram corresponding to an example herein.

The by-product coke from the delayed coking unit is gasified in a gasification unit to produce hydrogen. The coke fraction, oxygen or an oxygen-containing gas, and steam are introduced and gasified in the gasification zone of a membrane wall reactor. The gasification reactor is operated at 1045° C. The water-to-carbon weight ratio is 0.6 and the oxygen-to-pitch weight ratio is 1. After the gasification is completed, the raw syngas products are sent with steam from a boiler or a process heat exchanger as feedstream to a water gas shift (WGS) reactor to increase the hydrogen yield in WGS product steam. The water gas shift reactor is operated at 318° C., one bar of pressure and a water-to-hydrogen ratio of 3. The process material balance is given in Table 2, with reference to streams labeled in FIG. 7.

TABLE 1

Properties of Arab Heavy crude oil

| Property | | Arab Heavy CO |
|---|---|---|
| Density | Kg/Lt | 0.8904 |
| API Gravity | ° | 27.4 |
| Carbon | W % | 84.82 |
| Hydrogen | W % | 12.18 |
| Sulfur | W % | 2.83 |
| Nitrogen | ppmw | 1,670 |
| MCR | W % | 8.2 |
| Nickel | ppmw | 16.4 |
| Vanadium | ppmw | 56.4 |
| $C_5$-Asphaltenes | W % | 7.8 |
| $C_7$-Asphaltenes | W % | 4.2 |
| Toluene insolubles | W % | 0.0008 |
| Ashes | W % | 0.014 |
| 36-190 | W % | 11.9 |
| 190-370 | W % | 28.0 |
| 370-540 | W % | 26.3 |
| 540+ | W % | 33.8 |

TABLE 2

Material Balance

| Stream# | Stream Name | Feedrate kg | Density Kg/Lt | API Gravity ° | Sulfur W % |
|---|---|---|---|---|---|
| 1 | Arab Heavy CO | 1000.0 | 0.8904 | 27.4 | 2.830 |
| 2 | Gases | 38.0 | | | |
| 3 | SR Distillates | 673.2 | 0.8310 | 38.8 | 1.384 |
| 4 | Cracked Products | 590.9 | | | |
| 5 | Vacuum Residue | 326.8 | 1.0450 | 3.9 | 5.394 |

TABLE 2-continued

Material Balance

| Stream# | Stream Name | Feedrate kg | Density Kg/Lt | API Gravity ° | Sulfur W % |
|---|---|---|---|---|---|
| 6 | Cracked Distillates | 155.6 | 0.8500 | 35.0 | 5.440 |
| 7 | Coke | 133.7 | | | |
| 8 | Gases | 58.7 | | | |
| 9 | Synthetic CO | 814.8 | 0.8000 | 45.4 | 0.005 |
| 10 | Hydrogen | 25.2 | | | |
| 11 | Steam | | | | |
| 12 | Hydrogen | 15.0 | | | |

The invention has been described with reference to its preferred embodiments and an example and various modifications will be apparent to those of ordinary skill in the art from this description. The scope of protection which is to be accorded the invention is to be determined by the claims that follow.

The invention claimed is:

1. An integrated process for upgrading a crude oil feedstock comprising:
   fractionating both the crude oil feedstock and coker thermally cracked hydrocarbon products in a fractionating zone to separate commingled hydrocarbons into hydrocarbon distillates and coker recycle oil,
   wherein the hydrocarbon distillates contain hydrocarbon components from the crude oil feedstock as straight run distillates corresponding to straight run naphtha, straight run kerosene and all or a portion of straight run gas oil, and hydrocarbon components from the coker thermally cracked hydrocarbon products as coker distillates, corresponding to coker naphtha, coker kerosene, light coker gas oil and all or a portion of heavy coker gas oil, and
   wherein the coker recycle oil contains hydrocarbon components from the crude oil feedstock as vacuum residue and/or heavy vacuum gas oil and hydrocarbon components from the coker thermally cracked hydrocarbon products with initial boiling points in the range of the vacuum residue and/or the heavy vacuum gas oil;
   thermally cracking the coker recycle oil to produce the coker thermally cracked hydrocarbon products that are passed to the fractionating zone;
   hydroprocessing the hydrocarbon distillates under conditions effective for desulfurization and conversion into lighter hydrocarbon distillates to produce a hydroprocessed liquid hydrocarbon effluent as a bottomless synthetic crude oil; and
   recovering coke from the coking zone, and gasifying at least a portion of the recovered coke in the presence of an oxygen-containing gas to produce hydrogen, and recycling at least a portion of the hydrogen to the integrated hydroprocessing step,
   wherein solid adsorbent material is added to the fractionating zone or the coker recycle oil prior to thermal cracking, wherein the coker recycle oil to adsorbent material ratio on a weight basis is 200:1-3:1, and wherein the adsorbent material is recovered with the coke.

2. The process of claim 1, wherein recovered coke is processed into a particulate form effective for gasification before gasifying.

3. The process as in claim 1, wherein thermally cracking is with a delayed coking unit.

4. The process as in claim 1, wherein thermally cracking is with a fluid coking unit.

5. The process of claim 1, wherein solid adsorbent material is added to the fractionating zone or the coker recycle oil prior to thermal cracking, wherein the coker recycle oil to adsorbent material ratio on a weight basis is 50:1-5:1, and wherein the adsorbent material is recovered with the coke.

6. The process as in claim 1, wherein hydroprocessing occurs at a total reaction pressure of about 60-300 bars, a temperature of about 300-500° C., a feed rate liquid hourly space velocity of about 0.1-10.0 $h^{-1}$, and a hydrogen to oil feed rate of about ratio of 500-2500 SLt/Lt.

7. The process as in claim 1, wherein hydroprocessing occurs in the presence of catalyst containing about 1-40 wt % of total active metals, has a total pore volume of about 0.15-1.70 cc/gm, a total surface area of about 100-900 $m^2$/g, and an average pore diameter of at least about 45 angstrom units, wherein the active metal is selected from the Periodic Table of the Elements IUPAC Groups 6, 7, 8, 9 and 10, and wherein the active metal is deposited or incorporated on a support selected from the group consisting of alumina, silica-alumina, silica, titania, titania-silica, titania-silicates, or zeolites.

8. The process of claim 7, wherein the active metal is one or more of cobalt, nickel, tungsten and molybdenum.

9. The process of claim 7, wherein at least a portion of the support material for the catalyst comprising a modified USY zeolite having one or more of Ti, Zr and/or Hf substituting the aluminum atoms constituting the zeolite framework.

10. The process of claim 1:
    wherein gasifying occurs at a temperature of about 900-1800° C., a pressure of about 20-100 bars, a mole ratio of oxygen-to-carbon content of the feedstock of about 0.1:1 to 2:1, and a mole ratio of steam-to-carbon content of the feedstock of about 0.1:1 to 10:1;
    wherein the oxygen-containing gas is oxygen or air; and
    wherein hydrogen is produced by subjecting cooled synthesis gas in a gasification reactor to a water gas shift reaction, recovering a mixed stream of hydrogen and carbon dioxide, and recovering a product stream of hydrogen.

11. The process of claim 10, wherein the water gas shift reaction occurs at a temperature of about 150-400° C.; a pressure of about 1-60 bars; and a mole ratio of water-to-carbon monoxide of about 5:1 to 3:1.

12. The process of claim 10, wherein gasification occurs in a membrane wall type gasifier.

13. The process of claim 1, wherein the bottomless synthetic crude oil has an API gravity that is at least 10 degrees greater than the API gravity of the crude oil feedstock.

14. The process as in claim 10, wherein the hydrogen recycled to the integrated hydroprocessing step from gasifying comprises all or a substantial portion of hydrogen required for hydroprocessing.

15. The process as in claim 10, wherein the hydrogen recycled to the integrated hydroprocessing step from gasifying comprises all hydrogen required for hydroprocessing, and wherein gasifying further produces excess hydrogen.

16. The process as in claim 1, wherein the coker recycle oil contains hydrocarbon components from the crude oil feedstock as vacuum residue having an initial boiling point in the range of about 510-565° C. and hydrocarbon components from the coker thermally cracked hydrocarbon products with initial boiling points in the range of the vacuum residue.

17. The process as in claim 1, wherein the coker recycle oil contains hydrocarbon components from the crude oil feedstock as heavy vacuum gas oil having an initial boiling point in the range of about 450-510° C. and hydrocarbon components from the coker thermally cracked hydrocarbon products with initial boiling points in the range of the heavy vacuum gas oil.

18. The process as in claim 1, wherein crude oil feedstock has an API gravity of at least 27.4°.

19. The process as in claim 1, wherein crude oil feedstock has an API gravity of at least 30°.

20. The process as in claim 1, wherein, prior to hydroprocessing the hydrocarbon distillates, removing all or a portion of the hydrocarbon distillates in a boiling point range corresponding to naphtha or light naphtha, and combining the removed hydrocarbon distillates in the boiling point range corresponding to naphtha or light naphtha with the hydroprocessed liquid hydrocarbon effluent.

* * * * *